(12) United States Patent
Kang et al.

(10) Patent No.: US 11,087,133 B2
(45) Date of Patent: Aug. 10, 2021

(54) METHOD AND APPARATUS FOR DETERMINING A TARGET OBJECT, AND HUMAN-COMPUTER INTERACTION SYSTEM

(71) Applicant: Baidu USA LLC, Sunnyvale, CA (US)

(72) Inventors: Le Kang, Sunnyvale, CA (US); Yingze Bao, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 83 days.

(21) Appl. No.: 16/528,134

(22) Filed: Jul. 31, 2019

(65) Prior Publication Data
US 2021/0034868 A1   Feb. 4, 2021

(51) Int. Cl.
*G06K 9/00* (2006.01)
*H04W 4/35* (2018.01)

(52) U.S. Cl.
CPC ..... *G06K 9/00664* (2013.01); *G06K 9/00335* (2013.01); *G06K 9/00369* (2013.01); *H04W 4/35* (2018.02)

(58) Field of Classification Search
CPC .......... G06K 9/00664; G06K 9/00369; G06K 9/00335; H04W 4/35
See application file for complete search history.

(56) References Cited

U.S. PATENT DOCUMENTS

| 2013/0335572 | A1* | 12/2013 | Fuhr ........................ H04N 7/18 348/150 |
| 2015/0019391 | A1* | 1/2015 | Kumar ................. G06Q 10/087 705/28 |
| 2019/0188876 | A1* | 6/2019 | Song ......................... G06T 7/70 |
| 2019/0347826 | A1* | 11/2019 | Zhang .................. G06K 9/4604 |
| 2019/0392589 | A1* | 12/2019 | Hirakawa ............... G06T 7/246 |
| 2020/0279124 | A1* | 9/2020 | Huang ............... G06K 9/00369 |

* cited by examiner

*Primary Examiner* — Ming Y Hon
(74) *Attorney, Agent, or Firm* — Nixon Peabody LLP

(57) ABSTRACT

Embodiments of the present disclosure disclose a method and an apparatus for determining a target object and a human-computer interaction system. The method according to one embodiment of the present disclosure comprises: in response to detecting a position change of an item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection. This embodiment improves accuracy of the determined target object.

16 Claims, 7 Drawing Sheets

300

| Upper left | Upper middle | Upper right |
|---|---|---|
| Middle left | Center | Middle right |
| Lower left | Lower middle | Lower right |

500

┌─────────────────────────────────────────────────────────────┐
│ in response to detecting a position change of the item, determine a │
│ target image acquisition device for acquiring the to-be-detected image │  501
│ frame sequence based on a position of the item │
└─────────────────────────────────────────────────────────────┘
                                  ↓
┌─────────────────────────────────────────────────────────────┐
│ determine, from among an image frame sequence acquired by the │
│ target image acquisition device, image frames acquired at acquisition │
│ moments with a time span from the detection moment being shorter │  502
│ than a preset time length to thereby form the to-be-detected image │
│ frame sequence │
└─────────────────────────────────────────────────────────────┘
                                  ↓
┌─────────────────────────────────────────────────────────────┐
│ perform a human body key point detection to a to-be-detected image │  503
│ frame in the to-be-detected image frame sequence │
└─────────────────────────────────────────────────────────────┘
                                  ↓
┌─────────────────────────────────────────────────────────────┐
│ determine a target object which performs a target operation action to │
│ the item based on a detection result of the human body key point │  504
│ detection │
└─────────────────────────────────────────────────────────────┘

Fig. 5

METHOD AND APPARATUS FOR DETERMINING A TARGET OBJECT, AND HUMAN-COMPUTER INTERACTION SYSTEM

TECHNICAL FIELD

Embodiments of the present disclosure generally relate to the field of computers, specifically relate to the field of image recognition, and more particularly relate to a method for determining a target object, an apparatus for determining a target object, and a human-computer interaction system.

BACKGROUND

A smart shop refers to a retail establishment where customers may pick up goods at their own will and upon completion of purchase, bills are automatically pushed to them without a need of queuing for checkout, which offers a novel retail experience.

To autonomously provide retail services to customers, it is required to automatically determine which customer buys which item. That is, it is required to identify which item on which shelf is taken away by which customer.

SUMMARY

Embodiments of the present disclosure provide a method for determining a target object, an apparatus for determining a target object, and a human-computer interaction system.

In a first aspect, embodiments of the present disclosure provide a method for determining a target object which performs a target operation action, comprising: in response to detecting a position change of an item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection.

In some embodiments, the in response to detecting a position change of an item, determining a to-be-detected image frame sequence based on a detection moment when the position change is detected, comprises: in response to detecting the position change of the item, determining the detection moment when the position change is detected; and arranging, in an acquisition moment order, image frames with a time span between their image acquisition moments and the detection moment being shorter than a preset time length to thereby form the to-be-detected image frame sequence.

In some embodiments, the performing a human body key point detection to a to-be-detected image frame in the to-be-detected image frame sequence comprises: performing the human body key point detection to a target image frame, in the to-be-detected image frame sequence, whose image acquisition moment is closest to the detection moment.

In some embodiments, the in response to detecting a position change of an item, determining a to-be-detected image frame sequence based on a detection moment when the position change is detected, comprises: in response to detecting the position change of the item, determining a target image acquisition device for acquiring the to-be-detected image frame sequence based on a position of the item; determining, from among an image frame sequence acquired by the target image acquisition device, image frames acquired at acquisition moments with a time span from the detection moment being shorter than the preset time length to thereby form the to-be-detected image frame sequence.

In some embodiments, the determining a target object which performs a target operation action to the item based on a detection result of the human body key point detection comprises: determining the target object based on a distance between each human body object and the item in the detection result of the human body key point detection in the target image frame.

In some embodiments, the distance between a human body object and the item in the target image frame is determined through a distance determining step comprising: for a human body object in the target image frame, detecting whether a hand key point indicating a hand of the human body object exists in the target image frame; in the case of existence, using a distance between the hand key point of the human body object and the item as the distance between the human body object and the item.

In some embodiments, the distance determining step further comprises: for the human body object in the target image frame, if the key point indicating the hand of the human body object does not exist in the target image frame, selecting, in a key point priority order, a key point with the highest priority existing in the human key points of the human body object in the target image frame; and using a distance between the selected human body key point and the item as the distance between the human body object and the item.

In some embodiments, the determining a target object which performs a target operation action to the item based on a detection result of the human body key point detection comprises: generating a movement trajectory of each human body object in the to-be-detected image frame sequence based on the detection result of the human body key point detection with respect to each of the to-be-detected image frames; determining, from among respective movement trajectories, a trajectory point with a closest distance from the item as a candidate trajectory point and determining the target object based on the distance between the determined candidate trajectory point and the item.

In some embodiments, for a human body object in the to-be-detected image frame, if the detection result of the human body key point detection with respect to the human body object indicates that the hand key point of the human body object exists in the to-be-detected image frame, the hand key point serves as a trajectory point on the movement trajectory of the human body object.

In some embodiments, for a human body object in the to-be-detected image frame, if the detection result of the human body key point detection with respect to the human body object indicates that the hand key point of the human body object does not exist in the to-be-detected image frame, selecting, from among the human body key points of the human body object in the to-be-detected image frame in a key point priority order, a key point with the highest priority as the trajectory point on the movement trajectory of the human body object.

In some embodiments, in the detection result of the human body key point detection, a position of each human body key point refers to a position in a preset three-dimensional coordinate system.

In some embodiments, the performing a human body key point detection to a to-be-detected image frame in the to-be-detected image frame sequence comprises: for a to-be-detected image frame in the to-be-detected frame sequence, determining an object region where each human body object is located in the to-be-detected image frame; and performing the human body key point detection to each object region to obtain a detection result of the to-be-detected image frame.

In a second aspect, embodiments of the present disclosure further provide a human-computer interaction system, comprising: a shelf on which an item is disposed, wherein at least one shelf segments a preset region to form an aisle; an image acquisition device configured for acquiring an image within at least one aisle; a sensor configured for detecting whether a position change occurs to the item on the shelf; and a processor configured for: in response to detecting the position change of the item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection.

In some embodiments, the image acquisition apparatus is a depth camera.

In a third aspect, embodiments of the present disclosure provide an apparatus for determining a target object which performs a target operation action, comprising: a to-be-detected image frame sequence determining unit configured for in response to detecting a position change of an item, determining a to-be-detected image frame sequence based on a detection moment when the position change is detected; a human body key point detecting unit configured for performing a human body key point detection to a to-be-detected image frame in the to-be-detected image frame sequence; and a target object determining unit configured for determining a target object which performs a target operation action to the item based on a detection result of the human body key point detection.

In a fourth aspect, embodiments of the present disclosure provide an electronic device, comprising: an interface; one or more processors; a memory on which one or more programs are stored; and one or more processors which are operatively connected to the interface and the memory, configured for: in response to detecting a position change of an item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection.

In a fifth aspect, embodiments of the present disclosure further provide an electronic device, comprising: one or more processors; a memory device configured for storing one or more programs, such that when the one or more programs are executed by the one or more processors, the one or more processors are caused to implement the method for determining a target object which performs a target operation action as described in the first aspect.

In a sixth aspect, embodiments of the present disclosure provide a computer-readable memory medium on which a computer program is stored, wherein the program, when being executed by one or more processors, causes the one or more processors to: in response to detecting a position change of an item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection.

In a seventh aspect, embodiments of the present disclosure provide a computer-readable memory medium on which a computer program is stored, wherein when the computer program is executed by one or more processors, the one or more processors are caused to implement the method for determining a target object which performs a target operation action as described in the first aspect.

The solutions for determining a target object which performs a target operation action as provided by the embodiments of the present disclosure adopt the following steps: first, in response to detecting a position change of an item, determining a to-be-detected image frame sequence based on a detection moment when the position change is detected; then, performing a human body key point detection to a to-be-detected image frame in the to-be-detected image frame sequence; and finally, determining a target object which performs a target operation action to the item based on a detection result of the human body key point detection. As such, it is implemented to determine, when determining that a position of the item has changed, a target object in the to-be-detected image frame which performs a target operation action to the item based on the result of performing a key point detection to a human body object in the to-be-detected image frame, which improves the accuracy of the determined target object.

BRIEF DESCRIPTION OF THE DRAWINGS

Other features, objectives, and advantages of the present disclosure will become more apparent through reading the detailed description of the non-limiting embodiments with reference to the drawings below:

FIG. 5 is a flow chart of another embodiment of the method for determining a target object which performs a target operation action according to the present disclosure;

Figure 1:
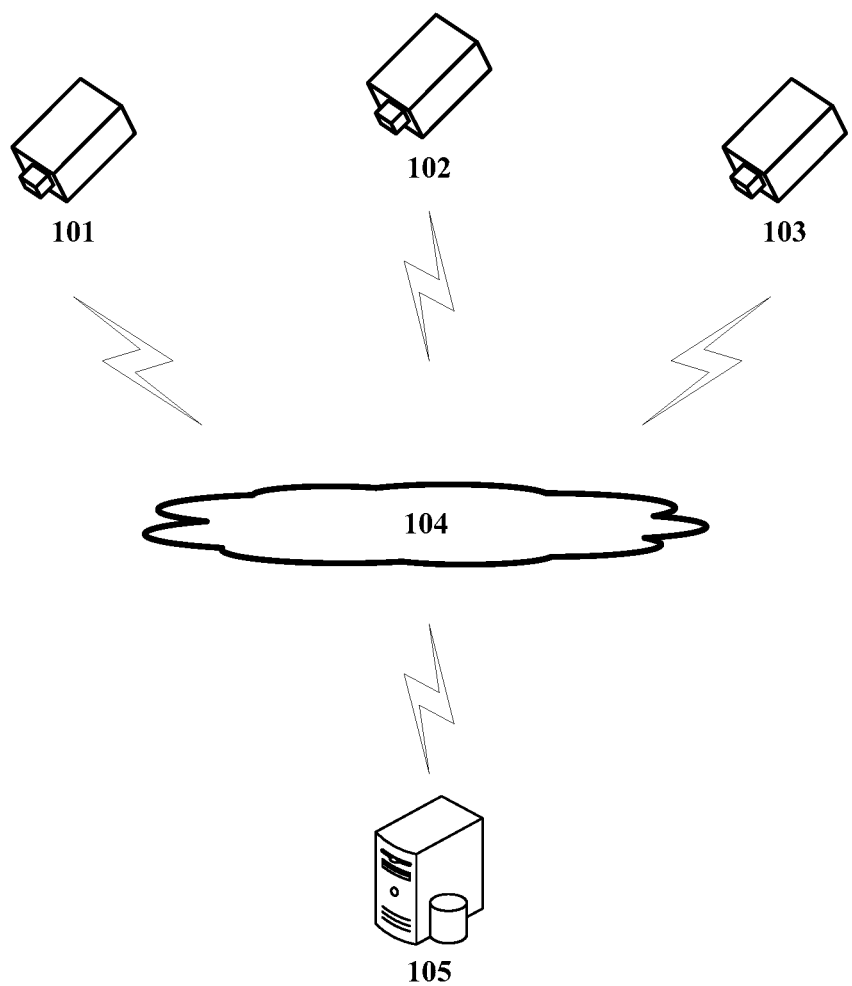
FIG. 1 is an exemplary system architecture diagram in which a method for determining a target object which performs a target operation action according to an embodiment of the present disclosure may be applied.

DETAILED DESCRIPTION OF THE
PREFERRED EMBODIMENTS

Hereinafter, the present disclosure will be described in further detail with reference to the accompanying drawings and the embodiments. It may be understood that the preferred embodiments described herein are only for illustrating, not for limiting the present disclosure. Additionally, it needs to be further noted that for the ease of depiction, only those parts related to the present disclosure are illustrated in the drawings.

Furthermore, it needs to be noted that without conflicts, the embodiments and the features in the embodiments of the present disclosure may be combined with each other. Hereinafter, the present disclosure will be described in detail with reference to the drawings in conjunction with the embodiments.

It should be noted that, the modification by "a" or "a plurality of" referred to in the present disclosure is meant to be illustrative and non-limiting, and should be construed as "one or more," unless otherwise expressly indicated in the context, as will be appreciated by those skilled in the art.

FIG. 1 illustrates an exemplary system architecture 100 that may apply the embodiments of the method for determining a target object which performs a target operation action or the apparatus for determining a target object which performs a target operation action according to the present disclosure.

As shown in FIG. 1, the system architecture 100 may comprise image acquisition devices 101, 102, and 103, a network 104 and a server 105. The network 104 is configured as a medium for providing a communication link between the image acquisition devices 101, 102, and 103, and the server 105. The network 104 may have various connection types, e.g., a wired/wireless communication link or an optical fiber cable, etc.

The image acquisition devices 101, 102, and 103 may transmit images as acquired to the server 105 via the network 104. The image acquisition devices 101, 102, and 103 may be various kinds of devices with an image acquisition function, including, but not limited to, a separately provided camera or an image acquisition unit integrated on another electronic device. These electronic devices for example may include, but are not limited to, a smart phone, a tablet computer, a laptop computer, and a desk computer, etc.

The server 105 may be a server that provides various services, e.g., a background server that processes the images acquired by the image acquisition devices 101, 102, and 103. The background server may perform data processing based on the received image and transmits a payment alert to an associated terminal (not shown) based on a processing result (e.g., information for indicating a person object picking up an item).

It needs to be noted that in the embodiments, the method for determining a target object which performs a target operation action may be performed by the server 105. Correspondingly, an apparatus for determining a target object which performs a target operation action may be provided in the server 105. Or, the method for determining a target object which performs a target operation action may be performed by a processor integrated on the image acquisition devices 101, 102, and 103. Correspondingly, an apparatus for determining a target object which performs a target operation action may be provided in the processor integrated on the image acquisition devices 101, 102, and 103.

It should be understood that the numbers of image acquisition devices, networks and servers in FIG. 1 are only schematic. Any numbers of image devices, networks and servers may be provided according to implementation needs. For example, the server may be a clustered server including a plurality of servers deployed with different processes.

Figure 2:
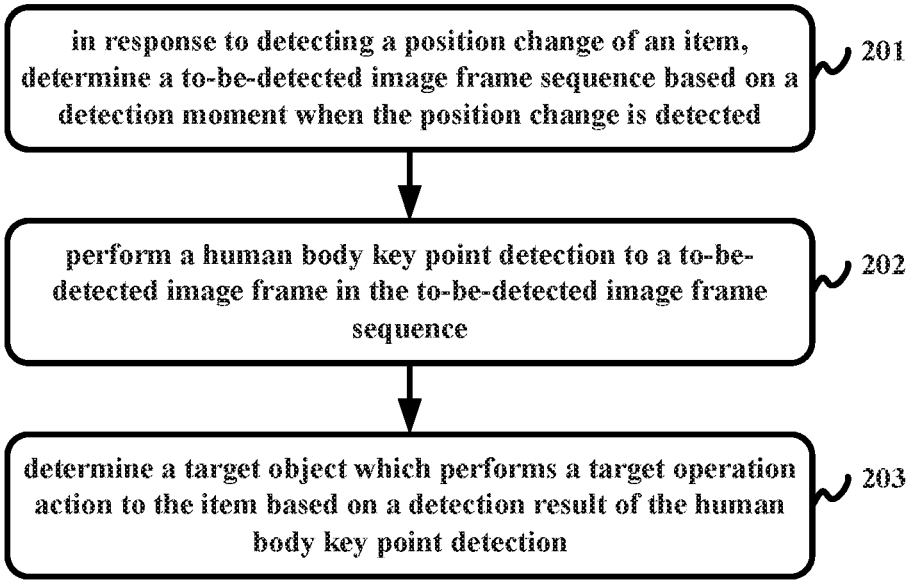
FIG. 2 is a flow chart of an embodiment of a method for determining a target object which performs a target operation action according to the present disclosure.

Continue to refer to FIG. 2, which shows a flow chart 200 of an embodiment of a method for determining a target object which performs a target operation action according to the present disclosure.

The method for determining a target object which performs a target operation action comprises steps of:

Step 201: in response to detecting a position change of an item, determining a to-be-detected image frame sequence based on a detection moment when the position change is detected.

Here, the item may be any goods existing in a real object form. For example, the item may be a commodity placed on a shelf for customers to select and purchase.

Various feasible manners may be leveraged to detect a position change of an item. For example, in some optional implementation manners, a plurality of gravity sensors may be provided on a shelf where the item is located. If one or more certain gravity sensors on the shelf detect a gravity change, it may be determined that a position change occurs to the item placed on the shelf.

Or, in some other optional implementation manners, a plurality of image acquisition devices may be provided, wherein each image acquisition device may acquire images within a region of the shelf where the item is located at a certain sampling interval. If a discrepancy exists in the images acquired at adjacent sampling moments, it may be determined that a position change occurs to the item within an acquisition scope of the image acquisition device.

Or, in some other optional implementation manners, a position sensor (which may include, but is not limited to, a photoelectric position sensor, a magnetic induction position sensor, etc.) may also be provided on the shelf where the item is placed. If one or more certain position sensors on the shelf detect a position change, it may be determined that a position change occurs to the item placed on the shelf.

Besides, it may be understood that in some optional implementation manners, position change of the item may be detected using a combination of multiple sensors, e.g. probabilities of occurrence of item position change determined by any at least two of the gravity sensor, the image acquisition device, and the position sensor may be weighted, and then whether the position change of the item occurs is determined based on a weighted sum.

If it is determined that the position change occurs based on the detection results of the sensors, the executing body may further determine the moment when the position of the item changes.

In some optional implementation manners, the moment when the executing body makes a determination result that "the position of the item has changed" may be directly used as the detection moment.

Or, in some other optional implementation manners, when the executing body makes the determination result that "the position of the item has changed," an acquisition moment as the basis for making the determination result that "the position of the item has changed" may be used as the detection moment when the position change is detected. Specifically, for example, in some application scenarios, whether position change occurs to the item is determined based on the images acquired by the image acquisition device at adjacent sampling moments. Supposing that the executing body receives the image acquired at the moment $t_1$ and the image acquired at the moment $t_2$ ($t_2 > t_1$) and determines that the image acquired at the moment $t_2$ is different from the image acquired at the moment $t_1$ (i.e., position change of the item occurs), then moment $t_2$ may be used as the detection moment when the position change is detected.

A to-be-detected image frame sequence may be determined based on the determined detection moment when the position change is detected.

Here, the to-be-detected image frame sequence may be a sequence formed by arranging, in an acquisition moment sequence, the image frames acquired by the image acquisition device, which is disposed nearby the item with position changed, for acquiring the images of an object (e.g., a person) performing a target operation action (e.g., pick up) to the object.

In some optional implementation manners, if position change of the item is detected, the detection moment may be determined by the above manners. Next, those image frames in the image frames acquired by the image acquisition device, where time spans between their acquisition moments and the detection moment are shorter than a preset time length, may be arranged in an acquisition time order, to thereby form the to-be-detected image frame sequence.

For example, in some application scenarios of these optional implementation manners, if the detection moment when the position change is detected is Mar. 28, 2019, 10:01:58 am, the to-be-detected image frames acquired at the image acquisition moments from Mar. 28, 2019, 10:00:58 am to Mar. 28, 2019, 10:02:58 am may be arranged in an acquisition time order to form an image frame sequence as the to-be-detected image frame sequence.

Step 202: performing a human body key point detection to a to-be-detected image frame in the to-be-detected image frame sequence.

A human body key point detection refers to determining, from an image, one or more key points belonging to a certain human body. The human body key point for example may be a point which may reflect key information of a certain aspect of the human body object. Specifically, in the method for determining a target object which performs a target operation action according to various embodiments of the present disclosure, in order to determine the object (i.e., target object) which performs the target operation action, the human body key point for example may be a feature point which may reflect a pose of the human body object in the to-be-detected image frame. For example, a human body key point may include a point characterizing a part of a human body, such as head, neck, shoulder, elbow, hand, and arm, etc. Through the human body key point detection, positions of respective key points in the to-be-detected image frame may be determined, and poses of the human body object in the to-be-detected image frame may be determined based on the positions of respective key points.

In some embodiments, when performing a human body key point detection to a to-be-detected image frame in the to-be-detected image frame sequence, an object region where the human body object is located in the to-be-detected image frame may be first determined; and then the human body key point detection is performed in the determined object region, thereby obtaining a detection result of the to-be-detected image frame. In this way, by first determining the region where the human body object is located and then performing the human body key point detection in the region, it may be guaranteed that the detected human body key point is located within the region where the human body object is located, thereby improving the reliability of human body key point detection.

It may be understood that if the to-be-detected image frame includes a plurality of human body objects, the human body key point detection may be performed to a plurality of human body objects included in the to-be-detected image frame to thereby obtain a detection result. For example, object regions where respective human body objects in the to-be-detected image frame are located may be first determined, and then the human body key point detection is performed to the determined object regions, respectively, thereby obtaining the human body key points of respective human body objects in the to-be-detected image frame.

Here, any feasible algorithm may be employed to perform the human body key point detection. For example, a top-to-down detection approach may be employed; or, a down-to-top detection approach may be employed.

Particularly, a top-to-down human body skeleton key point locating algorithm mainly includes two parts: human body detection and individual human body key point detection, i.e., first, each person is detected out using a target detection algorithm, and then a human body skeleton key point detection is performed to the individual person based on a detection box. For example, the key point detection may be performed using a CPM (Convolutional Pose Machines). Specifically, a network structure is divided into a plurality of stages, wherein the first stage generates a preliminary key point detection effect, and in the following stages, a predicted output of a preceding stage and a feature extracted from the original image serve as inputs, thereby further improving the key point detection effect. Or, a CPN (Cascaded Pyramid Network) may also be employed to perform key point detection. Specifically, the CPN includes a GlobalNet and a RefineNet, wherein the GlobalNet is responsible for detecting those key points which are easy to detect or those key points which are hard to detect, while the RefineNet is responsible for detecting those key points which are harder to detect and even those invisible key points; a union of their detection results may serve as the final detection result of the human key point detection.

The down-to-top approach also includes two parts: key point detection and key point cluster, namely, first, it is needed to detect all key points in an image, and then all key points are clustered into different individuals via a relevant strategy. In the down-to-top approach, how to accurately connect and cluster the detected key points is key to the accuracy of the final detection result. For example, a Part Segmentation algorithm may be employed to cluster the key points. Specifically, a human body is segmented into different parts, while the key points all fall at specific positions of segmented regions; the relationship between key points is modeled through part segmentation, which may not only explicitly provide spatial priori of human body key points to guide the network to learn, and meanwhile play a corresponding role of connecting the key points when clustering different human body key points. Or, a PAFs (Part Affinity Fields) algorithm may be adopted to model. Specifically, different limb structures of a human body may be modeled, and a vector field may be employed to simulate different limb structures, thereby solving a wrong connection issue caused by the sole approach of determining whether middle points are on the limbs.

The detection result obtained in step 202 for example may include labeling information and corresponding position information of the detected human body key points.

Here, the labeling information for example may refer to any information that may characterize the identities of human body key points. For example, information for characterizing the human body object to which a human body key point belongs (e.g., whether it belongs to human body object A or human body object B) and a type to which the key point belongs (e.g., whether the key point characters a head or elbow or hand or other part of the human body object).

In addition, the position information may refer to any information that may qualitatively or quantitatively describe an actual position of a human body key point. For example, the position information may be coordinates of the human body key point under a pre-established coordinate system.

Figures 3, 4:
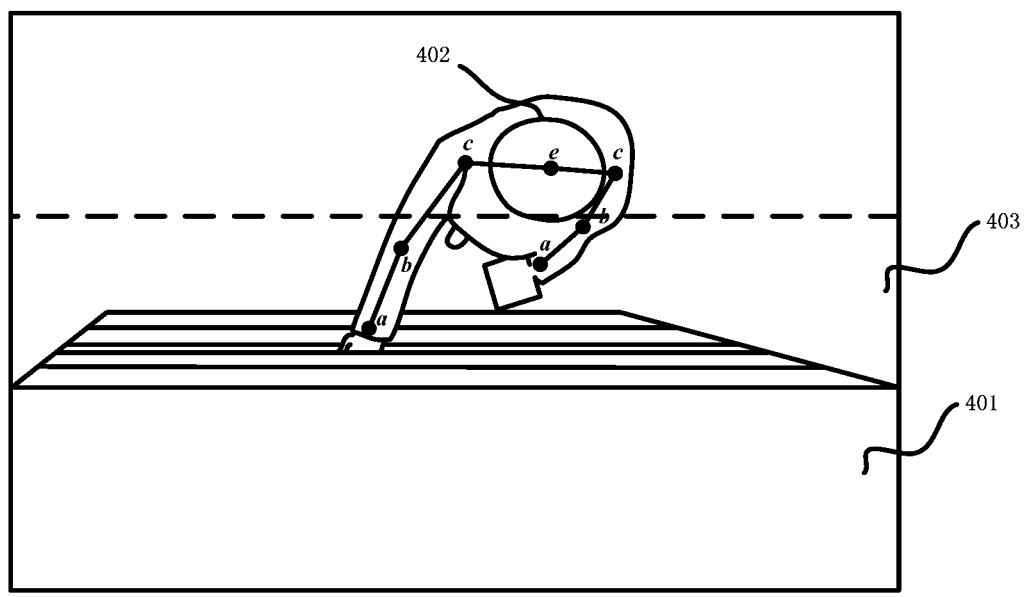
FIG. 3 shows a schematic region segmentation approach for a to-be-detected image frame in the method for determining a target object which performs a target operation action according to the present disclosure.
FIG. 4 is a schematic diagram of an application scenario of the method for determining a target object which performs a target operation action according to the present disclosure.

Or, the position information may also be descriptive information which qualitatively describes the actual position of the human body key point. For example, a to-be-detected image frame may be segmented into three regions in the horizontal direction: left region, middle region, and right region, and segmented into three regions in the vertical direction: upper region, middle region, and lower region; then, as shown in FIG. 3, the to-be-detected image frame 300 may be segmented into 9 regions (i.e., upper left, upper middle, upper right, middle left, center, middle right, lower left, lower middle, and lower right). Then, the position information of a human body key point may refer to the information for indicating in which of the 9 regions the human body key point is located.

Or, the position information may also be descriptive information which qualitatively describes whether the human body key point is located in a certain specific region in the to-be-detected image frame. For example, the position information may be used for describing whether the human body key point is located in the "upper right" region of the to-be-detected image frame segmented according to the manner shown in FIG. 3.

Step 203: determining a target object which performs a target operation action to the item based on a detection result of the human body key point detection.

As described in step 202, through the human body key point detection, labeling information and corresponding position information of human body key points in the to-be-detected image frame may be obtained; correspondingly, it may be determined, based on the position information and labeling information of the human body key points, which human body object performs a target operation action on the item.

For example, in some application scenarios, the target operation action of "picking up an item from the shelf" is detected. i.e., it is desired to determine, from the to-be-detected image frame, the human body object which performs the target operation action of "picking up an item from the shelf." Then, in these application scenarios, a hand key point of each human body object may be determined from the to-be-detected image frame, and the human body object which picks up the item from the shelf may be determined based on the position of the hand key point.

The solutions for determining a target object which performs a target operation action as provided by the embodiments of the present disclosure adopt the following steps: first, in response to detecting a position change of the item, determining a to-be-detected image frame sequence based on a detection moment when the position change is detected; then, performing a human body key point detection to a to-be-detected image frame in the to-be-detected image frame sequence; and finally, determining a target object which performs a target operation action to the item based on a detection result of the human body key point detection. As such, it is implemented to determine, in a to-be-detected image frame, a target object which performs a target operation action to an item based on a result of performing a key point detection to a human body object in the to-be-detected image frame when determining that a position of the item has changed, which improves the accuracy of the determined target object.

Continue to refer to FIG. 4, which is a schematic diagram 400 of an application scenario of the method for determining a target object which performs a target operation action according to the present disclosure.

In the application scenario shown in FIG. 4, it is intended to determine who picks up the item from the shelf.

In this application scenario, a camera (not shown) disposed above the shelf 401 may acquire images at a certain sampling time interval and transmit the acquired images to the processor for caching or storage. Moreover, a sensor which may detect whether a position of the item has changed may be disposed on the shelf. If it is detected that a certain item on the shelf has a position change, the sensor may emit a corresponding trigger signal to the processor, such that the processor may detect a to-be-detected image frame sequence from the cache or a unit storing the images acquired by the camera based on the moment of receiving the trigger signal emitted by the sensor.

Next, the processor may further perform a human body key point detection to a to-be-detected image frame in the to-be-detected image frame sequence to thereby obtain a detection result. The detection result for example may include labeling information and position information of a detected human body key point.

Specifically, in the application scenario shown in FIG. 4, the labeling information of a human body key point may be used for indicating a human body object 402 to which the human body key point belongs as well as a type of the human body key point. For example, the labeling information of the human body key point a may include information for indicating "hand of object 402," the labeling information of the human body key point b may include information for indicating "elbow of object 402," the labeling information of the human body key point c may include information for indicating "shoulder of object 402," while the labeling information of the human body key point e may include information for indicating "head of object 402".

Besides, in the application scenario shown in FIG. 4, the position information of a human body key point for example may be information for indicating whether a position of the human body key point is located within the shelf region. The shelf region for example is represented by the dotted-line block 403 in FIG. 4. It may be understood that the position and scope of the shelf region in the to-be-detected image frame for example may be pre-determined based on factors such as a relative position between the camera and the shelf 401, and the image acquisition range and angle of the camera.

If a detection result of the human body key point detection indicates that the hand and elbow of the human body object 402 are both within the shelf region 403, it may be regarded that the human body object 402 performs the action of "picking up the item" to the item on the shelf.

It may be understood that determination conditions for determining whether the human body object performs the target operation action of "picking up the item from the shelf" and which human body object in the to-be-detected image frame performs the target operation action of "picking up the item from the shelf" may be adjusted based on the application scenario and an expression form of the detection result of the human body key point detection. For example if in the detection result of the human body key point detection, the position information is expressed as the coordinate value of a human body key point in the to-be-detected image frame, then the human body object performs the target operation action of "picking up the item from the shelf" based on a distance between a position the human body key point characterizing the hand and a position of shelf or the item on the shelf.

Continue to refer to FIG. 5, which shows a flow chart 500 of another embodiment of the method for determining a target object which performs a target operation action according to the present disclosure.

The flow 500 of the method for determining a target object which performs a target operation action comprises steps of:

Step 501: in response to detecting a position change of the item, determining a target image acquisition device for acquiring the to-be-detected image frame sequence based on a position of the item.

In this step, the manner of detecting the position change of the item may be executed with a similar manner in step 201 in the embodiment shown in FIG. 2. That is, for example, a gravity change may be detected by a gravity sensor disposed on the shelf, and the gravity change is used as the basis for determining position change of the item. Or, shelf images are acquired by an image acquisition device at a certain sampling time interval, and then whether position change occurs to the item is determined by comparing the images acquired at the two moments. Or, whether position change occurs to the item is directly detected by a position sensor. Or, probabilities of occurrence of item position change determined by at least two of the above sensors may be weighted, and then whether the position change occurs to the item is determined based on a weighted sum.

Different from step 201, in this step, a target image acquisition device for acquiring the to-be-detected image frame sequence may be further determined based on a position of the item with occurrence of position change.

For example, in some optional implementation manners, a sensor for detecting item position change may have a position label indicating its position. In these optional implementation manners, if a certain sensor detects occurrence of item position change, the executing body may determine the position where the item position change occurs based on the position label of the sensor which detects the occurrence of item position change.

Further, in these optional implementation manners, an association relationship between the sensor for detecting the item position change and the image acquisition device for acquiring a to-be-detected image frame may be preset based on the position of the sensor for detecting an item position change and an image acquisition scope of the image acquisition device for acquiring the to-be-detected image frame.

In some application scenarios of these optional implementation manners, for example, the method for determining a target object which performs a target operation action in this embodiment is applied to a smart shop, and is used for determining, from an image, a human body object which picks up an item from a shelf. The image acquisition device for acquiring the to-be-detected image frame may be used for acquiring an image of a certain shelf or a certain region in the smart shop. In these application scenarios, the shelf region within the image acquisition range of the image acquisition device may be pre-associated with the image acquisition device.

Figure 6:
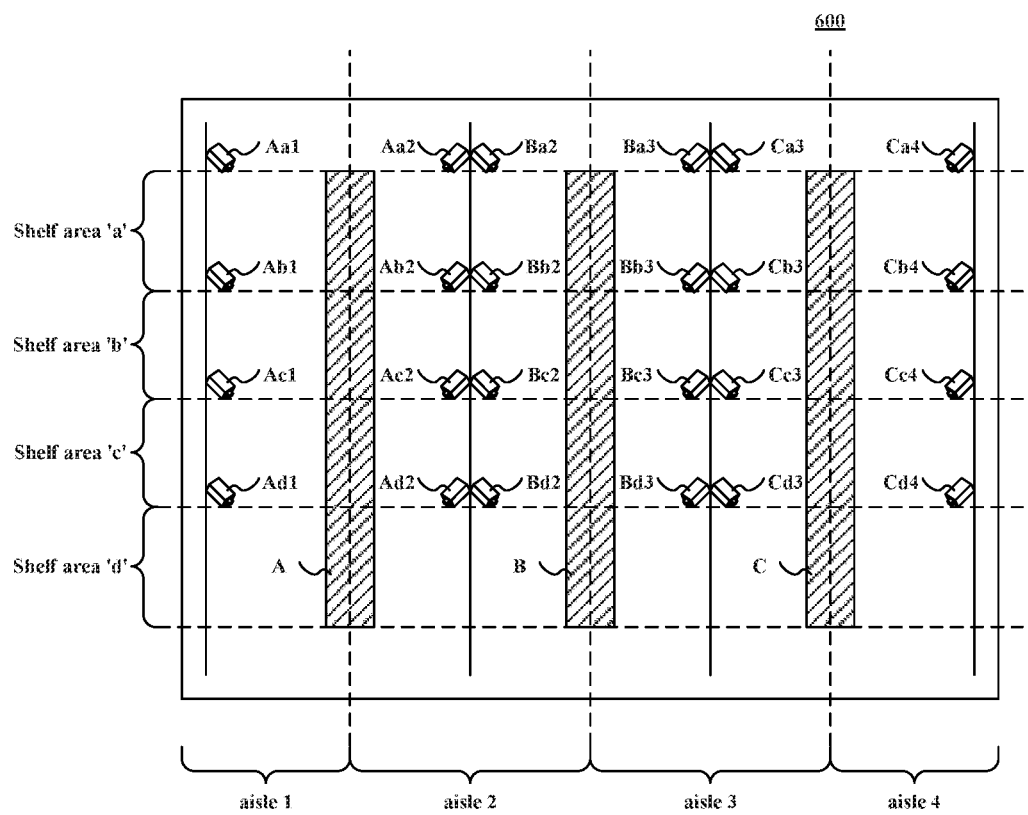
FIG. 6 is a schematic diagram of an application scenario where the method for determining a target object which performs a target operation action according to the present disclosure is applied.

For example, in the smart shop 600 shown in FIG. 6, three rows of shelves (i.e., shelves A~C) are arranged, wherein an aisle available for a user to pick up an item is disposed in front of each row of shelves, which means 4 aisles, aisle 1~aisle 4, are arranged in the retail shop 600. A plurality of sensors (not shown) for detecting an item position change may be provided in a shelf. Image acquisition devices for acquiring images of an aisle and corresponding shelves are arranged above the aisle (e.g., on a ceiling above the aisle and/or on a top portion of the shelves). FIG. 4 schematically illustrates that 4 groups of image acquisition devices are provided in each aisle, to acquire the images within a certain shelf region in the aisle, respectively. For example, the image acquisition device Aa1 acquires the image of the region 'a' of the shelf A of the aisle 1. In the smart shop 600 shown in FIG. 6, the image acquisition device Aa1 and the shelf region of the region a of the aisle 1 where the shelf A is located may be pre-associated. In this way, when the sensor disposed in the shelf region of region 'a' of the aisle 1 where the shelf A is located, i.e., a sensor having a position label for indicating the shelf region of "region 'a' of the aisle 1 where the shelf A is located, detects an item position change, the image acquisition device Aa1 may be determined as the target image sensor.

It may be understood that the image acquisition devices may one-to-one correspond to the shelf regions pre-associated therewith; or, the image acquisition devices and the shelf regions pre-associated therewith may have a "one to multiple" or "multiple to multiple" correspondence relationship.

Specifically, in some application scenarios, each image acquisition device may acquire an image within a certain shelf region, and different image acquisition devices may be used for acquiring the images within different shelf regions. With the smart shop 600 in FIG. 6 as an example, the image acquisition device Aa1 only acquires the image of the shelf A in the region a of the aisle 1.

Or, in some other application scenarios, a plurality of image acquisition devices may be arranged to acquire the images within a certain shelf region. For example, with the smart shop 600 shown in FIG. 6 as an example, in the shelf region of shelf A in the region 'a' of the aisle 1, a plurality of image acquisition devices for acquiring images within the shelf region may be arranged.

Or, in some other application scenarios, one certain image acquisition device may acquire the images within a plurality of shelf regions. For example, with the smart shop 600 shown in FIG. 6, the image acquisition device Aa1 may not only acquire the images in the shelf region of shelf A in the region a of the aisle 1, but also may acquire the images of the shelf region A in the region 'b' of the aisle 1: similarly, the image acquisition device Ab1 may not only acquire the images in the shelf region of shelf A in the region 'b' of the aisle 1, but also may acquire the images in the shelf region of shelf A in the region 'c' of the aisle 1, etc.

It may be understood that if the image acquisition devices and the shelf regions pre-associated therewith have a "multiple to multiple" correspondence relationship, the target image acquisition devices obtained through the step 501 may be plural.

Specifically, the illustration is still made with the smart shop 600 shown in FIG. 6 as an example. If in the smart shop 600, the image acquisition device Aa1 not only acquires the images in the shelf region of shelf A in the region 'a' of the aisle 1, but also acquires the images in the shelf region of shelf A in the region 'b' of the aisle 1, and the image acquisition device Ab1 not only acquires the images in the shelf region of shelf A in the region 'b' of the aisle 1, but also acquires images in the shelf region of shelf A in the region 'c' of the aisle 1, then, in the case that a sensor arranged in the shelf region of shelf A in the region 'b' of the aisle 1 (i.e., a sensor having a position label for indicating the shelf region of "shelf A in the region 'b' of the aisle 1") detects an item position change, because both of the image acquisition device Aa1 and the image acquisition device Ab1 may acquire the images in the shelf region of "shelf A in the region 'b' of the aisle 1," the shelf region may have an association relationship with both of the image acquisition device Aa1 and the image acquisition device Ab1. In this way, the image acquisition device Aa1 and the image acquisition device Ab1 may be determined as the target image acquisition devices.

Step 502: determining, from among an image frame sequence acquired by the target image acquisition device, image frames acquired at acquisition moments with a time span from the detection moment being shorter than a preset time length to thereby form the to-be-detected image frame sequence.

In this step, the manner of detecting the detection moment may be executed with a similar manner in step 201 in the embodiment shown in FIG. 2. Besides, the manner of determining, from among an image frame sequence acquired by the target image acquisition device, image frames acquired at acquisition moments with a time span from the detection moment being shorter than a preset time length may also adopt the manner described in step 201 of the embodiment shown in FIG. 2, which is thus not detailed here.

However, the difference from step 201 lies in that if the image acquisition devices and the shelf regions pre-associated therewith have a "multiple to multiple" correspondence relationship, the to-be-detected image frame sequence obtained through the step 502 may be one or more.

Specifically, just as mentioned in the description of step 501, the image acquisition devices and the shelf regions pre-associated therewith have a "multiple-to-multiple" correspondence relationship, which may be understood as such: a certain image acquisition device may acquire the images within a plurality of shelf regions, while the images within a certain shelf region may also be acquired by a plurality of image acquisition devices. For example, in the smart shop 600 shown in FIG. 6, the image acquisition device Aa1 not only acquires the images in the shelf region of shelf A in the region 'a' of the aisle 1, but also acquires the images in the shelf region of shelf A in the region 'b' of the aisle 1, and the image acquisition device Ab1 not only acquires the images in the shelf region of shelf A in the region 'b' of the aisle 1, but also acquires the images in the shelf region of shelf A in the region 'c' of the aisle 1: as such, the images in the shelf region of shelf A in the region 'b' of the aisle 1 may be acquired by the image acquisition device Aa1 and the image acquisition device Ab1.

In such an application scenario with a "multiple-to-multiple" correspondence relationship, a plurality of target image acquisition devices may be determined through the step 501. For example, in the example above, if it is detected that the shelf A in the region 'b' of the aisle 1 has an item position change, the target image acquisition devices corresponding to this shelf region may be the image acquisition devices Aa1 and the image acquisition devices Ab1.

In this way, based on the determined detection moment, a series of image frames acquired at the acquisition moments with a time span from the detection moment being shorter than a preset time length may be determined from the image frame sequence acquired by the target image acquisition device Aa1; and optionally, based on the determined detection moment, a series of image frames acquired at acquisition moments with a time span from the detection moment being shorter than a preset time length may be determined from the image frame sequence acquired by the target image acquisition device Ab1.

Further, in some application scenarios, the series of image frames acquired at the acquisition moments with a time span from the detection moment being shorter than a preset time length, as are determined from the image frame sequence acquired by the target image acquisition device Aa1, may serve as one to-be-detected image frame sequence (hereinafter shortly referred to as the to-be-detected image frame sequence a), and the series of image frames acquired at acquisition moments with a time span from the detection moment being shorter than a preset time length, as determined from the image frame sequence acquired by the target image acquisition device Ab1, may serve as another to-be-detected image frame sequence (hereinafter shortly referred to as the to-be-detected image frame sequence b); i.e., in this application scenario, two to-be-detected image frame sequences may be obtained through the step 502, i.e., the to-be-detected image frame sequence a and the to-be-detected image frame sequence b.

Or, in some other application scenarios, the to-be-detected image frame sequence a and the to-be-detected image frame sequence b respectively acquired by the target image acquisition device Aa1 and the target image acquisition device Ab1 may be spliced by a certain manner, and the spliced image frame sequence serves as the to-be-detected image frame sequence obtained from the step 502. In these application scenarios, any feasible manner may be adopted to splice. For example, these image frames may be arranged in an acquisition time order of the respective image frames in the to-be-detected image frame sequence a and the to-be-detected image frame sequence b, and the arranged image frame sequence serves as the to-be-detected image frame sequence. Or, the to-be-detected image frame sequence b may be directly spliced to a tail of the to-be-detected image frame sequence a to form the to-be-detected image frame sequence, or, the to-be-detected image frame sequence a is directly spliced to a tail of the to-be-detected image frame sequence b to form the to-be-detected image frame sequence.

Step 503: performing a human body key point detection to a to-be-detected image frame in the to-be-detected image frame sequence.

Step 504: determining a target object which performs a target operation action to the item based on a detection result of the human body key point detection.

The step 503 and the step 504 may be executed in a manner similar to the step 202 and the step 203 in the embodiment shown in FIG. 2, which will not be detailed here.

Compared with the embodiment shown in FIG. 2, the method for determining a target object which performs a target operation action in this embodiment may further determine a target image acquisition device from the image acquisition devices based on the association relationships between the sensor detecting the item position change and the image acquisition devices acquiring images. In this way, in the application scenario including a plurality of image acquisition devices, an image acquisition device which may acquire an image of the region where the item position change occurs may be determined based on the association relationship between the image acquisition devices and the sensors as well as the position where the item position change is detected, which further improving the possibility for the respective image frames in the to-be-detected image frame sequence to capture the operation object causing position change to the item.

It may be understood that in some optional implementation manners of the method for determining a target object which performs a target operation action according to various embodiments of the present disclosure, the step of performing a human body key point to a to-be-detected image frame in the to-be-detected frame sequence (e.g., step 202 in the embodiment of FIG. 2 or step 503 in the embodiment of FIG. 5) may be executed as follows:

performing the human body key point detection to a target image frame, in the to-be-detected image frame sequence, whose image acquisition moment is closest to the detection moment.

In this way, in these optional implementation manners, one target image frame from among the to-be-detected image frame sequence may be determined to be subjected to key point detection. Therefore, on one hand, the number of image frames for key point detection may be reduced; on the other hand, as the target image frame is acquired by the target image acquisition device at the moment closest to the detection moment, the image can more objectively reflect the scenario at the moment of occurrence of item position change, thereby improving the accuracy of determining the target object which performs a target operation action to the item.

It may be understood that if the optional implementation manner is applied to the step 503 in the embodiment shown in FIG. 5, the target image frame is an image frame in the image frame sequence acquired by the target image acquisition device.

Further, in some application scenarios of these optional implementation manners, if a target image frame is determined from the to-be-detected image frame sequence, the determining a target object which performs a target operation action to the item based on the detection result of the human body key point detection in various embodiments of the present disclosure may be performed as follows:

determining the target object based on a distance between each human body object and the item in the detection result of the human body key point detection to the target image frame. For example, a human body object with the closest distance from the item in the target image frame may serve as the target object. Or, the probabilities of respective human body objects to be target objects may be determined based on the distances between the respective human body objects and the item, and the human body object with the largest probability serves as the target object.

For example, in these application scenarios, the human body object picking up the item (the distance from the item is 0) in the target image frame may serve as the target object which performs the target operation on the item.

Or, in these application scenarios, although it is not presented in the target image frame that a certain human body object picks up the item, in the target image frame, there exists a human body object with a distance from the item being smaller than the distance between any other human body object in the target image frame and the item, then in this example, the human body object with the smallest distance from the object may be determined as the target object which performs a target operation (e.g., "pick-up" operation) on the item.

Here, when determining the distance between the human body object and the item, a certain point may be determined from the human body object based on a detection result of the human body key point detection, and the distance between the point and the item may serve as the distance between the human body object and the item.

For example, suppose human body object A and human body object B are presented in the target image frame. Moreover, in the key point detection result with respect to the target image frame, if key points a1~a7 of the human body object A are detected, and key points b1~b5 of the human body object B are detected. In this example, the positions of the key points a1~a7 may be averaged to obtain an average position a, and the positions of key points b1~b5 may be averaged to obtain an average position b; the average position a and the average position b are used to represent the positions of the human body object A and the human body object B in the target image frame, respectively. In this way, the distance d1 between a and the item may serve as the distance between the human body object A and the item, and the distance d2 between b and the item may serve as the distance between the human body object B and the item. By comparing d1 and d2, it may be determined which of the human body object A and the human body object B is the target object.

Figure 7:
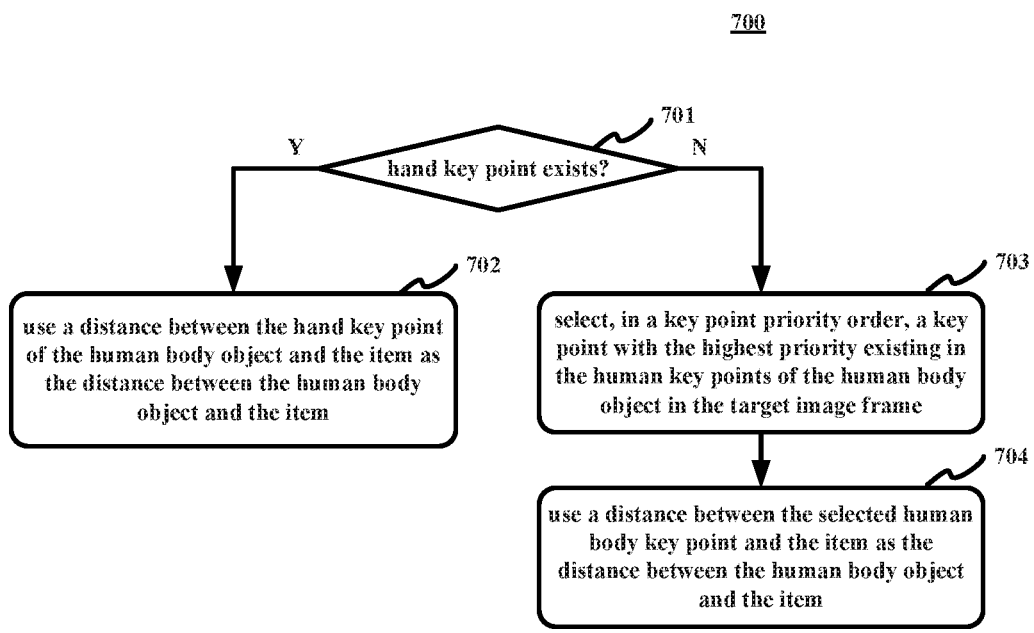
FIG. 7 is a schematic flow chart of determining a distance between each human body object and an item in the target image frame in some optional implementation manners of the method for determining a target object which performs a target operation action according to the present disclosure.

Or, as another example, the distance between respective human body objects and the item in the target image frame may be further determined through the flow shown in FIG. 7.

Specifically, first, as shown in step 701, a human body object (supposing selecting the human body object A) may be selected from the target image frame, and it is determined whether a hand key point for indicating the hand of the human body object A exists in the target image frame.

Next, if a hand key point of a certain human body object exists in the human body key point detection result of the target image frame, then as shown in step 702, the distance between the hand key point of the human body object and the item serves as the distance between the human body object and the item. For example, if a3 in the key points a1~a7 of the human body object A is the hand key point characterizing the hand of the human body object A, then the distance between a3 and the item may serve as the distance between the human body object A and the item.

Correspondingly, if the hand key point of a certain human body object does not exist in the human body key point detection result of the target image frame, then as shown in step 703, a human body key point of the human body is selected in a key point priority order.

Here, the key point priority order may be preset. For example, the key point priority order may be positively correlated based on the association degrees of the key points with the target operation action, i.e., the higher of the association degree between a key point with the target operation action, the higher the priority of the key point is. Specifically, if the target operation action is the action of "picking up the item," it is apparent that the association degree of the hand key point with the action of "picking up the item" is the highest; then, in step 701, it is first determined whether the hand key point exists in the target image frame. Further, because the association degrees of the elbow key point, the shoulder key point, the neck key point, and the head key point with the action of "picking up the item" gradually decreases, when determining the target object for the action of "picking up the item," the priorities of the key points may gradually decrease in an order of hand key point→elbow key point→neck key point→head key point, etc.

Or, the key point priority order may also be associated with a pose of a human body object in the target image frame. For example, poses of human body objects in the target image frame may be identified, and the key point priority order corresponding to the poses of the human body objects may be determined based on the preset correspondence relationships between the poses and the key point priority order.

Next, if it is selected in step 703 that the human body key point having the highest priority exists in the human body key points of a certain human body object in the target image frame, then in step 704, the distance between the selected human body key point and the item may serve as the distance between the human body object and the item.

For example, in the human body key point detection result with respect to the target image frame, it is detected that the key points b1~b5 of the human body object B refer to the elbow key point b1, the neck key point b2, the head key point b3, the hip key point b4, and the leg key point b5, respectively. Then, it may be seen from the predetermined priority order that the elbow key point b1 has the highest priority, such that the distance between the elbow key point b1 and the item serves as the distance between the human body object and the item.

It may be understood that in this example, if the key point detection result of the human body object A in the target image frame includes two key points for indicating the hand of the human body object A, which are denoted as key point a3 and key point a5, then a smaller one of the distance between a3 and the item and the distance between a5 and the item may serve as the distance between the human body object A and the item.

In some optional implementation manners of various embodiments of the present disclosure, the step of determining a target object which performs a target operation action to the item based on the detection result of the human body key point detection (e.g., step 203 in the embodiment of FIG. 2 or step 504 in the embodiment of FIG. 5) may be executed as follows:

first, generating a movement trajectory of each human body object in the to-be-detected image frame sequence based on the detection result of human body key point detection with respect to each of the to-be-detected image frames:

next, determining, from among each movement trajectory, a trajectory point with a closest distance from the item as a candidate trajectory point; and finally, determining the target object based on the distance between the determined candidate trajectory point and the item. For example, in the determined candidate trajectory point, the human body object corresponding to the candidate trajectory point with the smallest distance from the item serves as the target object. Or, the probabilities of the human body objects corresponding to the respective candidate trajectory points to be target objects may be determined based on the distances between the respective candidate trajectory points and the item, and the human body object with the largest probability serves as the target object.

It may be understood that in these optional implementation manners, an existing or future developed human face and/or human body recognition technology may be leveraged to distinguish the human body objects included in the respective to-be-detected image frames, and then the movement trajectories for respective human body objects may be obtained according to the manner above.

Further, in some application scenarios of these optional implementation manners, for a human body object in a to-be-detected image frame, if the detection result of the human body key point detection to the human body object indicates that the hand key point of the human body object exists in the to-be-detected image frame, the hand key point serves as a trajectory point on the movement trajectory of the human body object.

For example, in a certain to-be-detected image frame of the to-be-detected image frame sequence, if a3 in the key points a1~a7 of the human body object A is the hand key point characterizing the hand of the human body object A, then a3 may serve as a trajectory point of the human body object A.

Correspondingly, for the human body object in a to-be-detected image frame, if the detection result of the human body key point detection to the human body object indicates that the hand key point of the human body object does not exist in the to-be-detected image frame, according to a key point priority order from among the human body key points of the human body object in the to-be-detected image frame, a key point with the highest priority is selected as the trajectory point on the movement trajectory of the human body object. A specific implementation manner of selecting the key point with the highest priority from among the human body key points of the human body object in a priority order may be executed according the manner described in step 703 above, which will not be detailed here.

Besides, it may be understood that the target object which performs the target operation action to the item may be finally determined in consideration of the probabilities of the human body objects to be the target object determined based on the target image frame and the probabilities of the human body objects to be the target object determined based on the to-be-detected image frame sequence. For example, the probability of the human body object to be the target object determined based on the target image frame and the probability of the human body object to be the target object determined based on the to-be-detected image frame sequence may be weighted according to a predetermined weight manner, and the human body object with the largest probability in the weighted sums serves as the finally determined target object.

In various embodiments, various implementation manners, and various application scenarios of the present disclosure as described above, in the detection result of the human body key point detection, a position of each human body key point refers to the position in a preset three-dimensional coordinate system. In this way, in the target image frame, the positions of respective human body key points may be represented by the three-dimensional coordinates under the preset three-dimensional coordinate system. Similarly, the trajectory points in the movement trajectories of respective human body objects determined based on the to-be-detected image frame sequence may also be represented by the three-dimensional coordinates under the preset three-dimensional coordinate system.

For example, the image acquisition device for acquiring the image frame may be a depth camera. The depth camera may acquire plane images (e.g., color images) and depth images within its acquisition scope, and associate the pixel points in the planar images and the pixel points in the depth images, such that it may not only obtain the color information of any point in its acquisition scope but also may obtain the depth information of the point.

Besides, internal and external parameters of respective depth cameras for acquiring the image frames may be calibrated such that in the depth images acquired by respective depth cameras, the position of each pixel point may correspond to a three-dimensional coordinate position under a same preset three-dimensional coordinate system.

Correspondingly, the position of the item may be represented as a position under the same three-dimensional coordinate system.

For example, a three-dimensional Cartesian coordinate system may be established with a certain point in space as the origin, and the three-dimensional coordinates of respective items in the three-dimensional coordinate system may be determined. Besides, by calibrating the internal and external parameters of the depth cameras for acquiring image frames, each pixel point in the acquired depth image has three-dimensional coordinates under the three-dimensional Cartesian coordinate system.

In this way, when a sensor detects that a certain item is moved, the human body object which picks up the item may be determined based on the coordinates $(x_1, y_1, z_1)$ of the item under the three-dimensional coordinate system and the distance values between the three-dimensional coordinates of the human body key points of respective human body objects in the target image frame. Or, the human body object which picks up the item may be optionally determined based on the coordinates $(x_1, y_1, z_1)$ of the item under the three-dimensional coordinate system and the distance values between the coordinates of the trajectory points in the movement trajectories of respective human body objects under the three-dimensional coordinate system.

The present disclosure further provides a human-computer interaction system, comprising: a shelf, an image acquisition device, a sensor, and a processor.

Particularly, the shelf is placed with an item, and at least one shelf segments a preset region to form an aisle:

the image acquisition device is configured for acquiring an image within at least one aisle;

a sensor is configured for detecting whether a position change occurs to the item on the shelf; and a processor configured for: in response to detecting the position change of an item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection.

Besides, in the human-computer interaction system of the present disclosure, the processor may also determine the target object by executing the method for determining a target object which performs the target operation action as described in any embodiment above.

Optionally, in the human-computer interaction system, the image acquisition device may be a depth image. The depth camera may acquire plane images (e.g., color images) and depth images within its acquisition scope, and associate the pixel points in the planar images and the pixel points in the depth images, such that it may not only obtain the color information of any point in its acquisition scope but also may obtain the depth information of the point.

Besides, internal and external parameters of respective depth cameras for acquiring the image frames may be calibrated such that in the depth images acquired by respective depth cameras, the position of each pixel point may correspond to a three-dimensional coordinate position under a same preset three-dimensional coordinate system.

Figure 8:
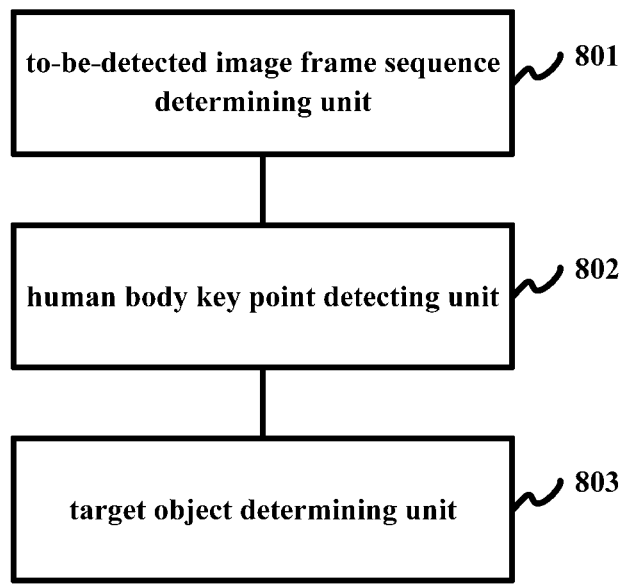
FIG. 8 is a structural diagram of an embodiment of an apparatus for determining a target object which performs a target operation action according to the present disclosure.

Further refer to FIG. 8. To implement the method shown in respective drawings above, the present disclosure provides an embodiment 800 of an apparatus for determining a target object which performs a target operation action. The apparatus embodiment corresponds to the method embodiment shown in FIG. 2. The apparatus may be specifically applied to various electronic devices.

As shown in FIG. 8, the apparatus for determining a target object which performs a target operation action according to this embodiment may comprise a to-be-detected image frame sequence determining unit 801, a human body key point detecting unit 802, and a target object determining unit 803.

The to-be-detected image frame sequence determining unit 801 may be configured for in response to detecting a position change of an item, determining a to-be-detected image frame sequence based on a detection moment when the position change is detected.

The human body key point detecting unit 802 may be configured for performing a human body key point detection to a to-be-detected image frame in the to-be-detected image frame sequence.

The target object determining unit 803 may be configured for determining a target object which performs a target operation action to the item based on a detection result of the human body key point detection.

In some embodiments, the to-be-detected image frame sequence determining unit 801 may be further configured for: in response to detecting the position change of the item, determining a detection moment when the position change is detected; and arranging, in an acquisition moment order, image frames with a time span between the image acquisition moment and the detection moment being shorter than a preset time length to thereby form the to-be-detected image frame sequence.

In some optional implementation manners, the human body key point detecting unit 802 may be further configured for: performing the human body key point detection to a target image frame in the to-be-detected image frame sequence, whose image acquisition moment is closest to the detection moment.

In some optional implementation manners, the to-be-detected image frame sequence determining unit 801 may be further configured for: in response to detecting a position change of the item, determining a target image acquisition device for acquiring the to-be-detected image frame sequence based on a position of the item; determining, from among an image frame sequence acquired by the target image acquisition device, image frames acquired at acquisition moments with a time span from the detection moment being shorter than a preset time length to thereby form the to-be-detected image frame sequence.

In some optional implementation manners, the target object determining unit 803 may be further configured for: determining the target object based on a distance between each human body object and the item in the detection result of the human body key point detection to the target image frame.

In these optional implementation manners, the target object determining unit 803 determines the distance between a human body object in the target image frame and the item through steps of: for a human body object in the target image frame, detecting whether a hand key point indicating a hand of the human body object exists in the target image frame; in the case of existence, using a distance between the hand key point of the human body object and the item as the distance between the human body object and the item.

Besides, in these optional implementation manners, the distance determining step further comprises: for the human body object in the target image frame, if the key point indicating the hand of the human body object does not exist in the target image frame, selecting, in a key point priority order, a key point with the highest priority existing in the human key points of the human body object in the target image frame; and using a distance between the selected human body key point and the item as the distance between the human body object and the item.

In some optional implementation manners, the target object determining unit 803 may be further configured for: generating a movement trajectory of each human body object in the to-be-detected image frame sequence based on the detection result of human body key point detection with respect to each of the to-be-detected image frames; determining, from among each movement trajectory, a trajectory point with a closest distance from the item as a candidate trajectory point; and determining the target object based on the distance between the determined candidate trajectory point and the item.

In these optional implementation manners, for a human body object in a to-be-detected image frame, if the detection result of the human body key point detection to the human body object indicates that the hand key point of the human body object exists in the to-be-detected image frame, the hand key point serves as a trajectory point on the movement trajectory of the human body object.

In these optional implementation manners, for the human body object in a to-be-detected image frame, if the detection result of the human body key point detection to the human body object indicates that the hand key point of the human body object does not exist in the to-be-detected image frame, selecting, in a key point priority order from among the human body key points of the human body object in the to-be-detected image frame, a key point with the highest priority as the trajectory point on the movement trajectory of the human body object.

In some optional implementation manners, in the detection result of the human body key point detection, a position of each human body key point refers to the position in a preset three-dimensional coordinate system.

In some optional implementation manners, the human body key point detecting unit 802 may be further configured for: for a to-be-detected image frame in the to-be-detected image frame sequence, determining an object region where the human body object is located in the to-be-detected image frame; and performing the human body key point detection in the determined object region, thereby obtaining a detection result of the to-be-detected image frame.

Figure 9:
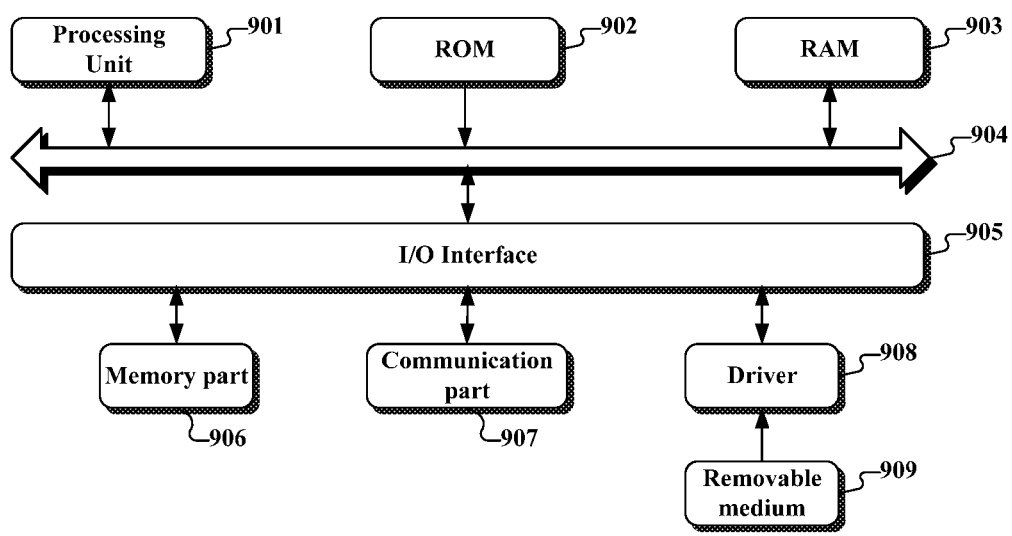
FIG. 9 is a structural schematic diagram of a computer system of an electronic device adapted for implementing the method for determining a target object which performs a target operation action according to an embodiment of the present disclosure.

Now refer to FIG. 9, which shows a structural schematic diagram of a computer system 1100 of an electronic device adapted for implementing a method for determining a target object which performs a target operation action according to the embodiments of the present disclosure. The electronic device shown in FIG. 9 is only an example, which should not constitute any limitation to the function and use scope of the embodiments of the present disclosure.

As shown in FIG. 9, the computer system 900 comprises a processing unit (e.g., CPU) 901 which may perform various kinds of appropriate actions and processing according to computer program instructions stored in a read-only memory (ROM) 902 or a program loaded into the random-access memory (RAM) 903 from a memory part 906. In RAM 903, there may also store various kinds of programs and data needed for operations of the system 900. Processing unit 901, ROM 902, and RAM 903 are connected with each other via a bus 904. The input/output (I/O) interface 905 may also be connected to the bus 904.

The following components are connected to the I/O interface 905, including: a memory part 906 including a hard disk, etc.; and a communication part 907 including a network interface card such as a LAN (Local Area Network) card, a modem, etc. The communication part 907 performs communication processing via a network such as the Internet. The driver 908 is also connected to the I/O interface 905 as needed. A removable medium 909, such as a magnetic disk, an optical disk, a magneto-optical disk, and a semiconductor memory, etc., is mounted on the driver 908 as needed, so as to facilitate the computer program read therefrom to be installed in the memory part 906.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 907, and/or installed from a removable medium 1109. When being executed by the processing unit 901, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program codes are carried. A data signal propagated in such a way may assume a plurality of forms, including but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program codes embodied on the computer-readable medium may be transmitted using any appropriate medium, including, but not limited to: wireless, wired cable, RF etc., or any appropriate combination thereof.

Computer readable program instructions for carrying out operations of the present invention may be compiled in one or more programming languages, the programming languages including object-oriented programming languages such as Java, Smalltalk. C++ or the like, as well as conventional procedural programming languages, such as the "C" programming language or similar programming languages. The computer codes may be executed entirely on the user's computer, partially on the user's computer, executed as a stand-alone software package, and partially on the user's computer and partially executed on a remote computer, or entirely executed on the remote computer or server. In a scenario involving a remote computer, the remote computer may be connected to the user's computer through any type of network, including a local area network (LAN) or a wide area network (WAN), or the connection may be made to an external computer (for example, through the Internet using an Internet Service Provider).

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks may be actually executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the embodiments of the present disclosure may be implemented by software or by hardware. The units as described may also be provided in a processor. For example, they may be described as: a processor comprising a to-be-detected image frame sequence determining unit, a human body key point detecting unit, and a target object determining unit. Particularly, names of these units do not constitute a limitation to the units per se in some circumstances. For example, the to-be-detected image frame sequence determining unit may also be described as "a unit for determining a to-be-detected image frame sequence based on a detection moment when the position change is detected, in response to detecting a position change of an item."

As another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: in response to detecting a position change of an item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection.

What have been described above are only preferred embodiments of the present disclosure and an illustration of the technical principle as exploited. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for determining a target object which performs a target operation action, comprising:
   in response to detecting a position change of an item, determining a to-be-detected image frame sequence based on a detection moment when the position change is detected;
   performing a human body key point detection to a to-be-detected image frame in the to-be-detected image frame sequence; and
   determining a target object which performs a target operation action to the item based on a detection result of the human body key point detection, wherein the in response to detecting a position change of an item, determining a to-be-detected image frame sequence based on a detection moment when the position change is detected, comprises:
   in response to detecting the position change of the item, determining the detection moment when the position change is detected; and
   arranging, in an acquisition moment order, image frames with a time span between the image acquisition moment and the detection moment being shorter than a preset time length to thereby form the to-be-detected image frame sequence.

2. The method according to claim 1, wherein the performing a human body key point detection to a to-be-detected image frame in the to-be-detected image frame sequence, comprises:
   performing the human body key point detection to a target image frame, in the to-be-detected image frame sequence, whose image acquisition moment is closest to the detection moment.

3. The method according to claim 2, wherein the determining a target object which performs a target operation action to the item based on a detection result of the human body key point detection comprises:
   determining the target object based on a distance between each human body object and the item in the detection result of the human body key point detection to the target image frame.

4. The method according to claim 3, wherein the distance between the human body object and the item in the target image frame is determined through a distance determining step including:
   for a human body object in the target image frame, detecting whether a hand key point indicating a hand of the human body object exists in the target image frame; and
   in the case of existence, using a distance between the hand key point of the human body object and the item as the distance between the human body object and the item.

5. The method according to claim 4, wherein the distance determining step further comprises:

for the human body object in the target image frame, if the key point indicating the hand of the human body object does not exist in the target image frame, selecting, in a key point priority order, a key point with the highest priority existing in the human key points of the human body object in the target image frame; and using a distance between the selected human body key point and the item as the distance between the human body object and the item.

6. The method according to claim 1, wherein the in response to detecting a position change of an item, determining a to-be-detected image frame sequence based on a detection moment when the position change is detected, comprises:

in response to detecting the position change of the item, determining a target image acquisition device for acquiring the to-be-detected image frame sequence based on the position of the item; and determining, from among the image frame sequence acquired by the target image acquisition device, image frames acquired at acquisition moments with a time span from the detection moment being shorter than a preset time length to thereby form the to-be-detected image frame sequence.

7. The method according to claim 1, wherein the determining a target object which performs a target operation action to the item based on a detection result of the human body key point detection comprises:

generating a movement trajectory of each human body object in the to-be-detected image frame sequence based on the detection result of human body key point detection with respect to each of the to-be-detected image frames;

determining, from among each movement trajectory, a trajectory point with a closest distance from the item as a candidate trajectory point; and determining the target object based on the distance between the determined candidate trajectory point and the item.

8. The method according to claim 7, wherein for the human body object in a to-be-detected image frame, if the detection result of the human body key point detection to the human body object indicates that the hand key point of the human body object exists in the to-be-detected image frame, the hand key point serves as a trajectory point on the movement trajectory of the human body object.

9. The method according to claim 8, wherein for the human body object in a to-be-detected image frame, if the detection result of the human body key point detection to the human body object indicates that the hand key point of the human body object does not exist in the to-be-detected image frame, selecting, from among the human body key points of the human body object in the to-be-detected image frame in a key point priority order, a key point with the highest priority as the trajectory point on the movement trajectory of the human body object.

10. The method according to claim 1, in the detection result of the human body key point detection, a position of each human body key point refers to a position in a preset three-dimensional coordinate system.

11. The method according to claim 1, wherein the performing a human body key point detection to a to-be-detected image frame in the to-be-detected image frame sequence comprises:

for a to-be-detected image frame in the to-be-detected frame sequence, determining an object region where each human body object is located in the to-be-detected image frame; and performing the human body key point detection to each object region to obtain a detection result of the to-be-detected image frame.

12. A human-computer interaction system, comprising:

a shelf on which an item is disposed, wherein at least one shelf segments a preset region to form an aisle;

an image acquisition device configured for acquiring an image within at least one aisle;

a sensor configured for detecting whether a position change occurs to the item on the shelf; and a processor configured for: in response to detecting the position change of the item, determining a to-be-detected image frame sequence based on a detection moment when the position change is detected; performing a human body key point detection to a to-be-detected image frame in the to-be-detected image frame sequence; and determining a target object which performs a target operation action to the item based on a detection result of the human body key point detection, wherein the in response to detecting a position change of an item, determining a to-be-detected image frame sequence based on a detection moment when the position change is detected, comprises:

in response to detecting the position change of the item, determining the detection moment when the position change is detected; and arranging, in an acquisition moment order, image frames with a time span between the image acquisition moment and the detection moment being shorter than a preset time length to thereby form the to-be-detected image frame sequence.

13. The human-computer interaction system according to claim 12, wherein the image acquisition device is a depth camera.

14. An apparatus for determining a target object which performs a target operation action, comprising:

a to-be-detected image frame sequence determining unit configured for in response to detecting a position change of an item, determining a to-be-detected image frame sequence based on a detection moment when the position change is detected;

a human body key point detecting unit configured for performing a human body key point detection to a to-be-detected image frame in the to-be-detected image frame sequence; and a target object determining unit configured for determining a target object which performs a target operation action to the item based on a detection result of the human body key point detection, wherein the in response to detecting a position change of an item, determining a to-be-detected image frame sequence based on a detection moment when the position change is detected, comprises:

in response to detecting the position change of the item, determining the detection moment when the position change is detected; and arranging, in an acquisition moment order, image frames with a time span between the image acquisition moment and the detection moment being shorter than a preset time length to thereby form the to-be-detected image frame sequence.

15. An electronic device, comprising:
an interface;

one or more processors;

a memory on which one or more programs are stored; and one or more processor that are operatively connected to the interface and the memory, configured for:

in response to detecting a position change of an item, determining a to-be-detected image frame sequence based on a detection moment when the position change is detected;

performing a human body key point detection to a to-be-detected image frame in the to-be-detected image frame sequence; and determining a target object which performs a target operation action to the item based on a detection result of the human body key point detection, wherein the in response to detecting a position change of an item, determining a to-be-detected image frame sequence based on a detection moment when the position change is detected, comprises:

in response to detecting the position change of the item, determining the detection moment when the position change is detected; and arranging, in an acquisition moment order, image frames with a time span between the image acquisition moment and the detection moment being shorter than a preset time length to thereby form the to-be-detected image frame sequence.

16. A non-transitory computer-readable memory medium on which a computer program is stored, wherein the program, when being executed by one or more processors, causes the one or more processors to:

in response to detecting a position change of an item, determining a to-be-detected image frame sequence based on a detection moment when the position change is detected;

performing a human body key point detection to a to-be-detected image frame in the to-be-detected image frame sequence; and determining a target object which performs a target operation action to the item based on a detection result of the human body key point detection, wherein the in response to detecting a position change of an item, determining a to-be-detected image frame sequence based on a detection moment when the position change is detected, comprises:

in response to detecting the position change of the item, determining the detection moment when the position change is detected; and arranging, in an acquisition moment order, image frames with a time span between the image acquisition moment and the detection moment being shorter than a preset time length to thereby form the to-be-detected image frame sequence.

* * * * *